United States Patent Office 3,827,982
Patented Aug. 6, 1974

3,827,982
MOLDABLE LEAD COMPOSITION
William Cornelius Hall, Albany Turnpike, Central Valley, N.Y. 10917, and John Merriam Peterson, Toleman Road, Rock Tavern, N.Y. 12575
No Drawing. Continuation-in-part of abandoned application Ser. No. 406,561, Oct. 26, 1964. This application Dec. 15, 1970, Ser. No. 98,459
Int. Cl. C04b 35/68, 43/00; E04b 1/74
U.S. Cl. 252—62         28 Claims

ABSTRACT OF THE DISCLOSURE

Dry lead powder is mixed with water. Substantially all free water is removed from the wet composition to produce a self-supporting lead composition. This composition can be used as a matrix into which aggregates are dispersed.

OTHER APPLICATIONS

This is a continuation-in-part of our earlier filed copending application, Ser. No. 406,561, filed Oct. 26, 1964, now abandoned.

FIELD OF INVENTION

This invention relates to improved moldable, self-supporting lead compositions and to new and improved methods for producing compositions especially useful for nuclear radiation shields with respect to the attenuation of various types of radiation of different energy levels and intensities.

BACKGROUND

Radiation shielding problems arise in connection with the protection of personnel and instruments in a variety of situations. These situations include, for example, the operation of industrial and research equipment such as, for example, X-ray machines, cyclotrons or other atomic particle accelerators, radar and other microwave or electronic equipment and nuclear reactors, the handling of radioactive isotopes, and protection against space radiation such as, for example, cosmic radiation. These situations relate to a wide variety of fields including, for example, medicine, oceanography, space technology, industrial processing, non-destructive testing, and electrical power production. These situations may, further, lead to concern with one or more of the following types of radiation: Alpha, beta, gamma ray or X-ray and radiation involving proton, positron, and neutron or other atomic particles. Each of these types of radiation become involved with matter in a substantially different manner and, as a further complication, radiation of a single type may interact differently with the same matter depending on the energy range of the radiation.

Gamma and X-rays are grouped together in this listing because they are identical, physically. Both are short-wave-length electromagnetic radiation and are classified as photons. They are differentiated only by their source of origin, with the term gamma ray referring to a photon of nuclear origin. The interaction of these photons with shielding material depends on their energy, regardless of their source, and consequently there is no need to differentiate these two types of radiations with respect to attenuating properties of shielding material.

Alpha and beta particles are not very penetrating, compared with gamma and neutron radiation, and they are comparatively easily stopped by a component added to a shield for other specific purposes. Consequently, they usually present no especially difficult shielding problems. On the other hand, neutron, and gamma radiations are relatively difficult to attenuate. However, protons are largely changed to neutron and gamma radiations by interactions with matter within the shield during the process of attenuation, and provision must be made in the over-all shield design for the end product of these changes. Thus, neutron and gamma radiations are ultimately the two important types of radiation from the shielding material viewpoint.

Gamma radiations are absorbed within materials mainly by interaction with electrons surrounding the nuclei of atoms and are usually involved with one or more of three processes namely: photoelectric, pair production and Compton effect.

For low-energy photons, the photoelectric effect is the most important factor. It involves essentially the absorption of the photon. This attenuation varies from element to element approximately as a function of the fifth power of the atomic number. The probability of this interaction is highest for the electrons most tightly bound, and about 80 percent of the interactions involve the K-shell electrons. The process is of the threshold type in that the photon energy must exceed the shell binding energy for the interaction to take place. This threshold value varies from element to element. In shielding situations involving fluxes near the K-edge of a component, it is desirable to use a second element with a different K-edge in order to obtain satisfactory attenuation over the energy range.

The heavy atoms, because of their high atomic numbers with high electron density within the atom, exhibit very high cross sections for this effect, and the lighter atoms, for contrasting reasons, are relatively very poor. Examples of some of the most effective heavy metals available commercially at relatively reasonable cost include lead, tungsten and uranium.

For high energy photons above the threshold of 1.02 mev., pair production is the dominant factor. Above this threshold, the cross-section increases monotonically and varies approximately as the second power of the atomic number of the atom. Again, heavy metals are much more effective than light metals for this process which also involves essentially total absorption of the photon.

The Compton effect is most important to the intermediate energy range, at which the total of all three cross-sections is lowest. The cross-section of this effect also varies from element to element as a function of the first power of the atomic number, and for any given element decreases monotonically with increasing photon energy. The photon is reduced in energy and is scattered in the Compton effect. The presence of these scattered photons effectively decreases the overall attenuation, and consequently, this process is less effective than the other two.

The neutron is an uncharged elementary particle that may exist within a wide range of energies. When neutrons are expelled by fission, they have high initial speeds with energies in the millions electron volt range. The uncharged neutrons are not influenced by the electrons or electric fields existing within atoms. However, neutrons do react with various nuclides and the interaction may be one of several types. For example, the neutron may be absorbed or scattered. In turn, the scattering may be elastic or inelastic, and the absorption may result in fission, the emission of a particle of various types such as, for example, an alpha particle, or the emission of electromagnetic radiation. These interactions are independent. The probability of neutron interaction with various nuclides is dependent upon the energy of the neutron, and usually is expressed in terms of a cross-section measured in the unit called the barn ($10^{-24}$ cm.$^2$). The most efficient way to capture a high energy neutron is first to decrease its energy by decreasing its speed by interaction with a moderator. Neutrons in a well moderated system tend to take on the temperature and, hence, the velocity values and energy characteristic of the temperature of the moderating materials. Neutrons that are in thermodynamic equilibrium with the surrounding moderator material are called thermal neutrons and have, at 70° F., a most probable energy of approximately 0.025 electron volt, which is equivalent to 2200 meters per second. In most shielding situations, thermal neutrons are more easily captured than those with high energies. Consequently, both neutron moderating materials and capture materials must be considered in shielding problems involving neutron attenuation.

Materials of low atomic weights moderate neutrons with energy levels below approximately 1 mev. more effectively than do materials of high atomic weights, because during elastic collisions, the nuclei of light atoms are able to absorb the neutron energy by recoil. Heavy atoms do not moderate these neutrons very rapidly because they do not recoil much. Hydrogen is the best moderator for neutrons below about 1 mev., because they have masses nearly equal to the mass of a neutron, and can reduce the energy of an ultrafast neutron to the thermal range by elastic scatter with a minimum number of collisions. The moderating materials in the order of moderating efficiencies are hydrogen, beryllium, lithium, boron, carbon, etc., which are all elements with low atomic numbers.

Beryllium and carbon in natural isotopic abundance are good moderators but have poor capture ability. Materials with high capture cross-sections such as boron, for example, are added to shielding materials to capture thermalized neutrons. High atomic weight elements exhibit good moderating properties for neutrons with energies above several mev., because of their ability to produce lower energy neutrons by inelastic collisions. During this process, a neutron first is captured by a nucleus and then, a very short time later, another neutron of lower energy is emitted simultaneously with the emission of a gamma ray or other form of radiation. The sum of the energies of the emitted neutron and the other radiation is equal to the energy of the original neutron. A good nuclear shield must, of course, provide also for the attenuation of the secondary radiation. Heavy materials usually do not have good attenuation characteristics for neutrons with intermediate energy.

Other interactions and mechanisms are encountered in the spectrum of nuclear shielding problems but the aforementioned examples serve to illustrate some of the complexities involved. The best shielding material requires optimization of several factors, both economically and technically, and will depend upon the specific situation under consideration.

SUMMARY OF INVENTION

A principal objective of this invention is to provide improved methods and compositions for producing nuclear radiation shields for the effective attenuation of X-ray and gamma radiation.

To achieve the above and other objects of the invention, there is provided in accordance therewith a method comprising mixing lead powder with water and removing free water from the resulting mixture to form a self-supporting lead composition. As a feature of the invention, excess water desirably is expressed initially from the mixture and this is followed by removing substantially all of said free water therefrom. Preferably, the weight of water in the mixture is initially between 4.5 and 7.5% of the weight of lead.

Another objective of this invention is to produce a lead composition containing effective neutron moderating or neutron capture substances useful for effective attenuation of nuclear radiations with mixed fluxes. This objective is achieved by dispersing a further material, selected for its desired characteristics, into the lead and water mixture.

The further material preferably may include hydrogen atoms in the form of compounds. Said further material may include atoms of lithium, boron and a lanthanide selected from a class comprising samarium, europium, gadolinium and disprosium, as effective neutron attenuating substances. Said further material also may include substances containing isotopes of an element in a ratio that deviates from that which is present in natural abundance, or a substance containing a heavy metallic atom of certain characteristics. The material may be in the form of aggregates.

In accordance with the invention, the composition may be in the form of a mortar which is applied to a surface as a plaster. Alternatively, the lead and water mixture may be placed in a mold prior to its setting. The invention also provides the lead compositions and structures resulting from the aforesaid methods and features.

Other objectives, features and advantages of the invention will be found in the detail description which follows hereinafter.

DETAILED DESCRIPTION

Lead is one of the most common and useful materials used for shielding against X-ray and gamma radiation. It has been used extensively in the form of blocks or sheet lead in connection with the shielding of nuclear reactors, particle accelerators, radio isotopes and X-ray equipment. In such form, it has, however, certain drawbacks. For one thing, the joints between plates or blocks permit radiation leakage or streaming. Also, the tendency of lead to creep or cold flow, even when subjected to no other force than its own weight, may necessitate massive steel or other supporting structures for the lead. Apart from the expense, inconvenience and bulk of such supporting structures, they frequently require tension members passing through the lead itself and forming radiation leakage paths.

An alternative to the use of blocks or plates is to pour the lead *in situ*. This is a comparatively expensive and difficult procedure and, while it eliminates joints as radiation leakage points, the poured lead has a tendency to have blow holes which may seriously impair the shielding efficiency. Pouring of molten lead, particularly in confined spaces, also presents a fire and serious health hazard, and the lead, when poured, still requires massive structural support by reason of its tendency to creep.

Moldable compositions containing lead which are free from at least some of the foregoing objections have been developed. These have been produced by dispersing lead or a lead compound into a cement matrix such as an organic plastic or resin, or an inorganic cement such as portland cement. In these examples, lead is the discontinuous phase, and consequently the lead content of the final composition is definitely limited. Other methods involve powder metallurgical methods requiring relatively high temperatures and pressures. Generally, these methods produce a precast form, and do not permit the formation of a homogeneous, seamless radiation shield in place at the desired location.

It has now been discovered that it is possible to produce a moldable lead composition by mixing lead powder and water. This composition, when set under appropriate conditions, has desirable structural and attenuating properties. This material possesses obvious advantages for shielding applications. In terms of mass involved, it consists practically entirely of lead. The only other elements present in significant quantities in this new composition are hydrogen and oxygen, which do not react with the primary radiation to give objectional radio-active isotopes, as do many elements often found in shielding materials. Traces of other elements in the lead powder and water used can be eliminated to any extent found necessary for particular application and, in any event, will be present in such small amounts as to be unobjectionable in practically all applications.

Use of lead with low radioactivity for shielding purposes in situations involving sensitive measurements may be cited as one of many examples where the radioactivity of the lead requires a high degree of selectivity. Lead may be a decay product of other radioactive elements and varies over wide limits with respect to its radioactivity, depending upon its source. Lead 210 is the particular naturally radioactive isotope that sometimes causes concern because of its long half life of approximately 21 years. Selection of old lead with 5 and more half lives sometimes is used as a criterion for selection. However, age alone is not a good basis for low activity selection, as other impurities, such as radium contamination can feed and replenish such activity. A preferred method of selection is to obtain samples free of significant contamination such, for example as radium, and then determine its quality by measurement of alpha emission. Lead may have a radioactivity of 30 to 50 or higher pico curie alpha per gram, and by proper selectivity its radioactivity may be as low as 0.5–1.0 pico curie alpha per gram. Research workers often seek lead with the lower range of radioactivity for their most sophisticated work. Lead powder produced from lead with any degree of low radioactivity desired may be used in the present invention to secure the shielding advantages described.

A typical composition according to the present invention was prepared in the following manner:

One gram of ordinary tap water was mixed thoroughly with sixteen grams of dry minus 200 mesh lead powder to form an easily workable paste. The paste was placed in a mold, the excess water expressed, and the mold was then left uncovered to permit the paste to set and cure for three weeks. The entire procedure was carried out at room temperature and without the application of any significant pressure.

The set composition was found to have entirely unexpected and remarkable properties. Instead of being of a plastic character similar to that of lead, the composition was hard and rigid, breaking under test after substantially no deflection and with a sharp fracture, and did not show the characteristic ductility of metallic lead.

An evaluation of mechanical or structural properties was made on a comparative basis with a number of building materials. The comparative specimens requiring curing were cured for three weeks, so as to make the conditions as uniform as possible. The comparison materials included Celotex, acoustical tile, sheet rock, plaster of Paris, portland cement (no sand) and three compositions prepared from lead powder dispersed in portland cement. The specimens were tested in flexure (beam deflection) and it was found that the composition of the invention had a tensile strength intermediate that of portland cement and plaster of Paris.

In one representative test, the breaking strengths were 550 p.s.i. for portland cement, 845 p.s.i. for the composition of the present invention and 1030 p.s.i. for plaster of Paris. Surprisingly, in these tests, the tensile strength of the lead composition exceeded that of the lead-portland cement compositions. The composition of the present invention broke without substantial deflection, similarly to the plaster of Paris and portland cement test pieces. The indicated tensile strength of the Celotex, acoustical tile and sheet rock were extremely low under the conditions of the test, and failure was preceded by great deflection, so that the tests afford no valid basis of comparison with these materials beyond indicating the rigid character of the composition of the invention.

The hardness of the material of the invention was found to be between that of portland cement and plaster of Paris, and greater than that of the specimens prepared from the lead-portland cement compositions. All these latter specimens were considerably harder than the Celotex or the sheet rock. These results appeared anomalous from the standpoint of known chemistry of lead and a number of investigations were made with a view to exploring and identifying the mechanism involved, so far as possible.

As noted above, the strength of the composition of the invention by comparison with some of the compositions containing lead and cement was observed with some surprise. In an effort to explore this point further, compositions were prepared containing lead powder and portland cement (no sand) in volumetric proportions varying from 100% lead to 100% cement and with the following results:

Effect of Addition of Portland Cement to Pb Powder-H₂O Cement

| Composition (by volume) | | Relative tensile strength, p.s.i. |
|---|---|---|
| Pb powder | Portland cement | |
| 1 | 0 | 845 |
| 3 | 1 | 240 |
| 1 | 2 | 180 |
| 1 | 3 | 310 |
| 0 | 1 | 550 |

As is apparent from this tabulation, the lead powder and water composition of the present invention shows a markedly higher tensile strength than either portland cement or various mixtures of portland cement and lead powder, and indicates that a bond of some character is formed between the lead particles which results in a composition of greater strength than is obtained where portland cement is used as a bonding agent. This is an unexpected and surprising result, in view of known theories concerning the formation of the bonds between various types of cement and mineral or metallic powders or aggregates.

The effect of the proportion of water to lead powder on the setting of the lead-water compositions was investigated. Three batches were tested each containing 400 grams of lead powder and, respectively, 20, 25 and 30 grams of water. The sample containing 20 grams of water was dry and difficult to mix and trowel. The sample with 25 grams of water worked well with a trowel and a little water came to the surface as it was pressed into a mold and its surface was smooth. The sample with the 30 grams of water worked easily but was "soupy," with considerable water coming to the surface.

The three samples just mentioned were covered during the first day to minimize evaporation of water, and were then placed in the open for further curing and drying at room temperature for a total of eight days. Unexpectedly, the water content of the set product, as calculated from weight loss during curing, was inversely proportional to the water content of the initial mixture. These results are summarized in the following table:

| Initial composition of Pb-H₂O mortar (wt.) | | | Wt. (g.) H₂O remaining after curing for— | | | Ratio (H₂O/Pb) in set cake, wt. |
|---|---|---|---|---|---|---|
| H₂O | Pb (g.) | H₂O/Pb | 1 day | 5 days | 8 days | |
| 20 | 400 | .050 | 15.1 | 11.2 | 10.2 | .0255 |
| 25 | 400 | .0625 | 19.7 | 10.8 | 10.0 | .0250 |
| 30 | 400 | .075 | 24.7 | 9.4 | 8.8 | .0220 |

The precise reasons for the inverse relationship between the initial water and retained water are unknown. However, the important conclusion for practical purposes is that any substantial excess water used in the initial mortar is lost and is not involved directly in the curing process.

With respect to the characteristics of the finished composition as produced from these mixtures, the mixture containing 20 grams of water set with a dark gray color, whereas those with more water showed a distinct yellowish surface color. It is thought that this color results from the formation of PbO (litharge) from oxidation of lead suboxide Pb₂O or metallic lead. A freshly broken edge of a one half inch thick sample showed a penetration of this yellowish color to approximately 20% to 30% of thickness of the samples containing more initial water, this penetration being in direct proportion to the amount of water initially present. This observation may suggest an appreciable porosity in the set material that is proportional to the initial water content, and this may account for mortars with the highest initial water content losing the greatest weight upon setting (i.e., mechanically trapped water within the cake evaporates more readily). Calculations were not corrected for any weight changes resulting from oxidation of the lead.

Further tests showed that it was not necessary to cover the mortar during the first day to minimize the evaporation of water. When this step was omitted in the setting process, the mortar set more quickly. Better results were achieved when any excess water in the initial lead-water mixture was expressed as soon as the mortar was placed in the form or mold. In larger molds, drainage holes in the form itself facilitate the elimination of this excess water. As an alternate method, additional dry lead powder may be added to absorb the excess water coming to the surface, provided the dry lead powder is worked thoroughly into the surface liquid and lower layers of mortar. Vibration and rodding techniques are particularly effective in causing excess water to come to the surface where it can be removed, even from mortars which initially appear to be relatively dry. Setting or curing of the mortar apparently occurs only after the removal of free water from the initial lead-water mixture. The initial expressing of excess water from the mortar by any means is the most rapid step for achieving this goal. Lead powder continuously covered by a layer of water showed no tendency to set after a period of several weeks.

The lead powder used in these tests was commercial lead powder in particle size passing a 200 mesh screen without limitation for the smaller size. Under the microscope, it showed a range of sizes with most of the particles between 0.0005 and 0.00005 inch in width. The shapes varied considerably from irregular "spheres" with length nearly the same as width to irregular rods with lengths about five times the width. The wide variation in particle size would tend to decrease the percentage of voids, while irregularity of shape might tend to increase this percentage.

The percentage of voids (gross volume as compared with volume of lead as indicated by weight and density) was around 50% as, for example, 52.1% in a vibrated or shaken down lead powder and 50.7% in the cured composition. Because theoretically obtainable percentage of voids may be brought below the 50% figure by merely paying suitable attention to shape, size and size distribution of the lead particles, it is apparent that the composition of the invention may be produced in a more compact and dense form wherever this is required. The densities of other cured compositions were found to vary between 5.6 g. cm.$^{-3}$ and 7.0 g. cm.$^{-3}$, compared with 11.35 g. cm.$^{-3}$ to 11.37 g. cm.$^{-3}$ for cast or rolled lead sheet, indicating a very satisfactory density of the composition for most radiation shielding applications.

Tests indicated that variation in mesh size of the lead powder was not a critical factor in the character of the set product produced. Particle sizes of the lead powder between about 150 microns and 25 microns all gave satisfactory products, although a slight improvement was noted in the particular samples used that were in the 50–100 micron range. Larger lead particle sizes are more easily tolerated, provided approximately 40 percent of the total mass lies in the 25 micron and smaller range.

The lead-water mortar composition may be used in the form of a comparatively stiff paste, either for molding, casting or for the application as a plaster. It also may be poured or sprayed. By using somewhat more water, it may be used in the form of a comparatively fluid slurry to facilitate pouring. In the latter method of application, however, it is particularly desirable that the excess of water be expressed. The lead composition as a plaster had good workability and shows good bonding properties when applied to a wall of building material, such as cement or brick, with or without a standard bonding agent. After curing, a protective coating of a resin or plastic such as vinyl resin or an epoxy may be applied to seal and harden the surface, or the surface may be painted for decorative purposes, if desired, in locations such as laboratories and medical rooms. The set material may be drilled, tapped, sawed, chiseled and otherwise rough worked.

The lead composition in paste or putty form also is very convenient to use in numerous situations such as, for example, repair work in nuclear radiation shields, for sealing pipe openings in construction walls, for sealing special windows in shielding walls and for use as a mortar between precast shielding blocks.

The lead-water composition also is a desirable encapsulation material for certain target materials to be irradiated. For a gamma emitter target, the lead composition attenuates the gamma from the target, while still retaining a relatively low activation. The encapsulating material may be safely removed when the activated target is placed in a glove box or behind a shadow shield. An electron emitter target causes X-rays to be emitted in all directions by bremsstralung effect, as the electrons strike the lead. Unlike the gamma emitter, the X-ray emission may be terminated on desire by removing the lead composition from its encapsulating position about the electron emitting material. In addition to taking the specific form of a radiological beam plug, radiological beam target, shadow shield, collimator, etc., the composition is a suitable material for a large number of general situations involving gamma radiation.

An elevated temperature decreases the setting time. A higher temperature may be employed by subjecting the wet samples to an oven treatment, or the mortar may be prepared using hot water or steam. There appears to be little difference in the character of the final product when these modified procedures are employed. It is not known whether the elevated temperature directly affects the rate of bonding action, or whether it merely assists in the removal of free water from the wet sample.

Several tests were made in connection with a search for the mechanism of the bonding action that takes place during the setting and curing of the lead powder-water mixture. As disclosed previously, the desired results were obtained when lead powder was mixed with tap water, the excess water expressed, and the resulting damp mixture allowed to set without cover in the normal atmosphere. The specimens so treated lost weight and assumed a "dry" appearance, presumably as the result of loss of additional free water. It is of course possible that part of the weight change resulted from a reaction of the paste with oxygen or other constituents found in air and tap water, or from reaction with small concentrates of other dissolved constituents in tap water. To throw further light on this hypothesis, several substances in minor quantities were added to the water used for preparing the mortar.

The substitution of one percent hydrogen peroxide aqueous solution for the water resulted in the production of initial bubbles, a somewhat slower setting time and a composition of a more yellow color.

The substitution of water saturated with carbon dioxide produced a composition which was somewhat more brittle and softer.

The substitution of a mixture of one percent hydrogen peroxide solution and water saturated with carbon dioxide, in equal parts, produced a somewhat softer cake.

The substitution of a sodium hydroxide solution consisting of four volumetric parts of water and one volumetric part of 6N NaOH, resulted in the generation of some heat, a blacker surface color, a faster initial set but less final strength.

The addition to the water of one gram of sodium carbonate to 25 cc. of water produced a hard but more brittle composition.

The substitution for the water of a sulphuric acid solution consisting of four volumetric parts water to one part 6N $H_2SO_4$ resulted in the generation of heat, difficult molding, a faster set and a final product of a greenish color which was softer and crumbled.

The substitution for the water of an ammonia solution consisting of four volumetric parts of water to one part 6N $NH_4O_4$ produced a product which was hard but brittle.

The substitution of lead oxide for all the lead powder resulted in the product of a much inferior cake which was easily broken.

This series of tests relative to the effect of additives indicate that they do not have appreciable desirable effects. They indicate, however, that a small addition of any of a variety of substances will not seriously interfere with the setting or properties of the composition. They also indicate that small amounts of Sb, As, Cu, which are often used to increase the hardness of lead for various applications, would not seriously interfere with the setting or character of the composition.

Lead powder exposed for an extended period of time to a damp atmosphere changed from a gray to a black or reddish color and, when substituted for fresh lead power, gave unsatisfactory results.

These tests suggest a possible bonding action caused by electrochemical action between pure lead particles and adjacent lead particles with a surface partly coated with a thin layer of lead oxide, resulting from exposure of the metal powder to atmospheric air during storage or from action of dissolved oxygen in the water used to form the paste mortar. Impurities in the tap water contribute to improved electrical conductivity of the water and this improvement of the electrolyte may assist in the overall activity of the numerous cells present. This electrochemical action, together with local action, could cause the mass transfer necessary for production of interlocking crystals and bonding action between particles.

Tests were then made, substituting other metallic powders for the lead powder to determine if similar results would be obtained. The results are tabulated in the following table:

| Metal | Specification | Oxidation potential | Nature of product after 15 days |
|---|---|---|---|
| Mg | | +2.34 | No cake. |
| Al | Dust | +1.67 | Very fragile, soft cake. |
| Zn | do | +0.76 | Fragile, soft cake. |
| Fe | 8 microns | +0.44 | Very fragile, soft cake. |
| Ni | Through 325 mesh | +0.25 | No cake, powder as original. |
| Sn | | +0.14 | Very fragile, soft cake. |
| Pb | | +0.13 | Hard, strong cake; comparable to portland cement. |
| H | | 0.00 | |
| Sb | Through 100 mesh | −0.10 | No cake, powder as original. |
| Bi | do | −0.20 | Very fragile, soft cake. |
| Cu | Through 325 mesh | −0.34 | Do. |
| Zn-Fe | Fine powder | | Fragile, soft cake. |
| Brass | 70 Cu-30 Zn | | No cake, powder as original. |
| Stainless steel | Fine powder | | Do. |

In the cases where a soft cake is indicated as being formed, the cake was, as stated, very fragile and broke unless handled very carefully, and the slight bonding was undoubtedly due to surface effects or Van der Waals forces. Hydrogen appears in the table merely as a reference point for the oxidation potential. The Zn-Fe material cited is a mixture of powdered zinc and powdered iron in equal volumetric quantities. It is apparent that, among the various metals tested, lead is the only one producing a bonded composition with significant mechanical strength after merely interacting the metallic powder with water. This unique characteristic of lead powder was surprising and totally unexpected.

With a view to a further identification of the nature of the bond, the electrical conductivity of the set composition was determined and found to be of the order of $10^{-5}$ times that of lead metal. The electrical conductivity was also found to increase appreciably as the composition was heated. The thermal conductivity, as might be expected, also was found to be much lower than metallic lead by several orders of magnitude. The conductivity determinations proved beyond any doubt that metallic lead, even though it is the dominant overall component, is not the continuous phase in the set composition, as the set composition as a whole acts as a semi-conductor. The semi-conductor property of the composition is consistent with a continuous phase composed of one or more oxides of the metal.

The cured composition was found to be quite stable up to the melting point of lead (327° C.). Above the melting point, lead leaked from the sample in appreciable quantities, and the broken edge of a piece, cooled after heat treatment above the melting point, showed very clearly many small globules of lead scattered along the broken surface, indicating a coalescence of much smaller lead particles, probably resulting from surface tension effects. In view of these observations, it appears clear that the interior of the lead particles remains largely in the form of metallic lead. This conclusion also is consistent with chemical analysis which shows the set and cured composition as substantially all lead.

More direct tests were made in an effort to understand the mechanism of the bonding action in the lead composition: An X-ray diffraction analysis compared the crystalline composition of a lead mortar cured for one week at room temperature with that of the lead powder from which the cake was made. It was thought that differences found in the crystalline nature of these two samples most likely would account for the bonding action. The instrument selected was a Norelco Wide Range Gonemeter with a scintillation detector. A copper target X-ray tube was used with a nickel foil K-beta filter. The procedure and equipment used was limited to the identification of crystalline material present in excess of approximately two percent.

A sample scraped from the interior of the set specimen showed only an increase in lead monoxide compared with the original lead powder. The alpha modification of the oxide predominated in quantity, and this suggested that the bonding action results from giant molecules in which each oxygen atom is surrounded tetrahedrally by four metal atoms, each of which in turn has four oxygen atoms associated with one side of it in a square, the bond distance being 2.30 Angstrom units. Because the lead powder has a very large particle size compared with atomic dimensions, only a relatively small percentage of oxygen, by either weight percent or mole fraction is sufficient to bond the surfaces of adjacent lead particles together to form a cake of substantial strength.

A substantial amount of test evidence indicates that the bonding action involves oxygen and lead atoms. Other evidence, based upon neutron attenuation observations, indicate that hydrogen atoms also are retained in a cured sample of the lead-water composition. This hydrogen content, irrespective of the form in which it is present, enhances the neutron attenuating characteristics of shields made from this composition. Direct analysis of hydrogen and oxygen in samples presents formidable difficulties and at best is subject to significant errors. Furthermore, the bonding action apparently is only at the surface of adjacent lead particles, which precludes satisfactory interpretations from overall chemical composition. Consequently, this invention is not limited to compositions dependent for their efficacy on any particular type of mechanism for its bonding action. Because of various uncertainties concerning the exact nature of the composition, this invention only can be described adequately by the method of production, rather than by bonding action or chemical composition.

As was disclosed previously in the particular examples cited, there is 39% to 52% voids in the lead composition of this invention, based on calculations made from density determinations. While this lead composition is very satisfactory as a gamma shield when compared with such standard material as ordinary concrete, significant improvement can be made to produce a higher density product with improved linear attenuation characteristics for this type of radiation. Such a product is obtained when lead metal aggregates in the form of spherical shot or other shapes are added to the lead powder-water mortar, which acts as the matrix to bind the composite composition together. The amount of lead aggregate added is largely limited only by the quantity of matrix required to fill the voids between the aggregate particles.

Calculations based upon geometric relationships of equal size spheres, independent of diameter, show a void space of 48% for open-packing (each sphere in contact with six other spheres), and 26% for close-packing (each sphere in contact with twelve adjacent spheres). These two values are theoretical extremes for equal sized spheres, which are not achieved in practice. Practical tests indicate that when mono-sized spheres are vibrated in a container, the spheres tend to achieve an open-pack configuration in the vertical direction and a close-pack structure in the horizontal direction, which yields an intermediate overall void space of approximately 38 percent.

Additional theoretical considerations show that void space is further reduced when using spheres of two different diameters, and maximum packing is secured when the larger spheres are infinitely large compared with the small ones. Such a system shows a limiting void space of approximately 14.4 percent. Similarly, a value of about 5.4 percent voids is predicted for a mixture of three different sizes, with the size ratio very large. This idealized system probably not attainable in practice, would contain approximately 62.0 volumes large, 23.6 volumes medium, 9.0 volumes fine and 5.4 volumes voids. Thus, wide variations are possible in the use of aggregates of different shapes, sizes and multiplicity of sizes, as well as compositions and densities.

In an experimental test, 2 volumes of a commercial grade lead powder (through 200 mesh) and 3 volumes of No. 12 lead shot were mixed with sufficient water to form a workable mass in a mixer, and then poured into a form to set and cure for ten days. This lead lead-mortar concrete had a density of nearly 10 g. cm.$^{-3}$ which is approximately 88 percent of the density for pure lead. Hand packing of the shot in the matrix permits the use of a higher percentage of aggregates, which gives a product of higher density. This increased density greatly improved the linear attenuation of the product for gamma radiation. Structural strength was diminished with increasing amounts of aggregates, but this problem may be minimized, if desired, by the use of structurally strong permanent forms used for casting the shield. The structural strength improved with longer curing periods.

Similar high density lead-mortar concretes of even higher density were produced when tungsten or depleted uranium aggregates were substituted for the lead shot. These elements, as aggregates, contribute not only in reducing overall void space, but also in increasing density of the product, as a result of their own inherent density of approximately 19 g. cm.$^{-3}$. Lead mortar concretes using these aggregates were produced with densities in the range of 14–15 g. cm.$^{-3}$.

Substitution of metallic ores or mine tailings as aggregates usually reduces the cost of the shield at the expense of high density and physical structure. These parameters may be optimized to meet requirements of the specific application. While attention in any given application may be directed primarily to some particular type of radiation, many applications involve multiple types of radiation in mixed fluxes as, for example, in reactor shielding where neutron and gamma ray attenuation are both major considerations. In these cases, the elemental composition of the shielding material must be adjusted appropriately, and consideration must be given to other properties such as structural and thermal properties of the material which also may be involved in a major way.

The shielding material of this invention as heretofore described has novel and improved characteristics with respect to gamma radiation, but it has limited value with respect to neutron attenuation in certain energy ranges. For example, neutrons with energies less than about 1.0 mev., penetrate lead with great ease.

It is a further objective of this invention to modify the high density lead composition to adapt it for use where a mixed flux of both gamma ray and neutron is encountered. This objective is accomplished by dispersing materials selected for their effective neutron moderating and/or capture characteristics, in the basic lead powder-water mortar. This material may occupy the voids previously noted in the basic lead composition, or it may be present in particle size larger than the lead powder, as aggregates in the lead powder-water composition that serves as the matrix. Use of water soluble materials may assist in the dispersion of these ingredients into the smallest of the void spaces.

The sizes and shapes of the dispersed materials in either free elemental form, in the form of compounds, natural ores, or concentrated ores may be optimized to secure a particular result. Examples of the parameters involved include: cost, type and energy of flux involved, effect of the dispersed material on the bonding action of the lead-water mortar, and physical dimensions of the shield itself. The aggregates preferably should be as small as practicable in order to obtain good homogeneity of attenuation throughout the shield. Generally, the inclusions may be increased in size in direct relationship to the thickness of the shield, and usually the aggregate size should not exceed one or two percent of the shield thickness. Various shapes may be employed, and improvement in physical structure of the overall shield may be achieved when choosing configurations such as, for example, rods and nails. Compromises in size and shape of material added to the matrix may be made to secure improvement in certain other properties such as, for example, density and structural strength.

Attenuation characteristics of a nuclear radiation shield usually depend more upon the atomic elemental chemical composition of the shield than upon the association of these atoms with other atoms in the composition, such as in compound formation. This situation gives wide choice relative to the particular form in which the aggregates are added to the matrix.

Typical is the hydrogen atom which is most efficient for neutron attenuation. Unfortunately, elemental hydrogen, which is a gas under usual operating conditions, cannot be added in any significant concentration to the lead-water matrix. However, hydrogen atoms may be added conveniently in the form of both inorganic and organic solid materials. Metal hydrides, hydroxides, hydrates and inorganic ammonium salts are examples of the inorganic substances that may be used. The organic materials containing hydrogen are even more numerous, but in general, high molecular weight hydrocarbons are preferred because of their higher hydrogen content. The high carbon content of these hydrocarbons also gives good neutron moderation.

Boron, with its high thermal neutron cross-section, also may be added in many different forms, among which are included: metallic boron, boron alloys, boronated graphite, boron containing minerals or natural ores, glasses or ceramic materials, and boron compounds such as the carbide, nitride, borates, borides, etc. Illustrative of these materials is colemanite a common natural ore, which may be used in boron concentrations of 30% or higher, expressed as $B_2O_3$. High boron silicate glasses and boron frits, produced by drastic quenching of molten glasses, may be used in controlled particle size. Tetra-boron carbide is particularly useful in many shielding situations because it combines in a single compound a good moderator (carbon) and a good capture element (boron), and also because of its high boron concentration and its availability.

To further illustrate this flexibility of choice, carbon, which is a good moderator for neutrons with higher thermal energies may be added in elemental form, as an organic compound, or in inorganic form as a carbide, carbonate, etc. In elemental form, it may be added as anthracite or bituminous coal, charcoal, lamp black or graphite, the choice depending on such factors as particle size, impurities present, and cost.

Similar wide ranges of choices are available with respect to the use of other effective attenuating materials. Specific limitations depend only upon such factors as compatability of the composition involved, physical structure, particle size, costs, etc. For most shielding situations, a compromise between conflicting factors is necessary.

Many other elements also are effective in thermal neutron capture and several selected samples are compared in the following table, with respect to cross-section values expressed in barns:

TABLE I.—NEUTRON THERMAL CROSS-SECTIONS

| Element | Isotope* and abundance | Reaction cross-sections absorption (barn) | Scattering cross-section total (barn) |
|---|---|---|---|
| Hydrogen | | 0.33 | 38 |
| Lithium | $n$ | 71 | 1.4 |
| Do | $Li^6$ (7.5) | 945 | |
| Beryllium | $Be^7$ | 51,000 | |
| Do | $Be^9$ | 0.01 | |
| Boron | | 755 | 4 |
| Do | $B^{10}$ (18.8) | 4,010 | |
| Carbon | $n$ | 3.2 | 4.8 |
| Cadium | $n$ | 2,550 | 7 |
| Do | $Cd^{113}$ (12.3) | 20,800 | |
| Samarium | $n$ | 5,500 | |
| Do | $Sm^{149}$ (13.8) | 50,000 | |
| Europium | $n$ | 4,600 | 8 |
| Gadolinium | $n$ | 46,000 | |
| Do | $Gd^{157}$ (15.7) | 240,000 | |
| Dysprosium | $n$ | 1,100 | 100 |

*Number in parenthesis indicates the percent of the isotope in natural isotopic abunaance; $n$ . . . indicates that the element is in natural isotopic abundance.

Several elements are omitted in the tabulation, because they become activated when subjected to certain radiation fluxes. For example, sodium has a good thermal cross-section of 525 barns and a scatter cross-section of 4 barns, but it has the definite disadvantage for many shielding applications of becoming radioactive in the shielding composition, and thus complicating the problem.

While the moldable lead compositions of this invention have particularly valuable characteristics when used for nuclear shielding purposes, the compositions are adaptable to many other applications. The following examples suggest a few of the many applications for the purpose of illustrating the widely diversified field of uses.

Previous mention was made of the unusual electrical and thermal characteristics of the set lead powder-water mortar of this invention, with values lower by orders of magnitude than those predicted for a chemical composition with such a high lead content. The characteristic of this composition may also be modified by dispersions of a wide range of additives to meet special requirements.

The compositions of this invention also have been found useful in the attenuation of sound waves. The high densit of the lead is effective when used as a noise barrier, and by the addition of low density aggregates to the lead powder-water matrix, the acoustical attenuation characteristics of the set product may be extended over a wide frequency range of sound.

A combination of desirable characteristics, including such properties as high acoustical attenuation, low thermal conductivity, non-combustibility, convenience of applications, etc., found in many of the compositions of this invention, make them suitable for use as sound and fire barriers in building wall construction, or as a plaster to existing walls.

To further illustrate the multifarious combinations which may be employed to carry this invention into effect, several specific formulations will be cited. It is to be understood, however, that these particular compositions and descriptions of the method used in different applications are given for the purposes of illustration only, and that the invention is not limited thereto.

Previously described is a typical formulation and method of preparation for the basic lead-water composition of this invention. The following examples relate to the compositions in which various materials are dispersed randomly in the form of a multiplicity of masses into the dry lead powder or into the lead-water mortar. The preparation of the composite mortar, its application to various specific situations, and the method of setting or curing of the mortar to secure a self-supporting structure do not differ substantially from that previously described for the basic lead-water composition. One skilled in the art of working with mortars can adjust readily to compensate for such variables as components, concentrations, and particle size to produce a workable mortar or concrete of the desired composition.

EXAMPLE 1

Lead powder, 65 volumes, and lithium carbonate, 35 volumes, were mixed dry and then water was added to form an easily moldable paste. This mixture was placed in a mold and the excess water expressed. The sample was allowed to stand two days in an oven at 100° F. through which was passed a slow stream of nitrogen gas to facilitate the removal of free moisture. The casting improved in structural strength with age.

Similar results were obtained with the substitution of lithium orthosilicate and lithium fluoride respectively, for the lithium carbonate.

The percent by weight of lithium in these compounds, dispersed in the lead-water matrix, are approximately as follows: lithium carbonate—18.8%, lithium orthosilicate—23.1%, and lithium fluoride—26.7%. The thermal neutron capture in the cast nuclear radiation shield is directly proportional to these respective concentrations on a weight basis.

EXAMPLE 2

Two parts by weight of lead powder were mixed with one part by weight of lithium carbonate, and water was added to produce a moldable composition. The set and cured composition was particularly an effective neutron and gamma radiation shield, especially useful for work involving instrumentation. While lithium in this composition has a lower cross-section for the capture of thermal neutrons (71 barns) compared with boron (759 barns), it has the advantage over boron as a thermal neutron capture atom in that it avoids the approximate one-half mev. gamma radiation induced by a boron capture.

Substitution of lithium carbonate, enriched with lithium 6 isotope, for the lithium carbonate containing 6 atoms in natural abundance (7.5 percent lithium 6 atoms) produced more efficient capture of thermal neutrons. Further improvement for special instrumentation work requiring a low background environment was achieved through the use of low background lead with high chemical purity in the preceding example.

EXAMPLE 3

A mixture was prepared from dry ingredients in the following weight proportions:

80 parts lead powder (minus 200 mesh)
12 parts polyethylene beads (1500–2000 micron diameter)
4 parts polyethylene powder (150–200 micron diameter)
2 parts lithium hydroxide mono hydrate (LiOH·H$_2$O)
1 part boric acid.

Sufficient water was added to form a thick putty which subsequently was cast in a mold to cure. Hydrogen atoms in different type compounds and aggregate sizes are added as ingredients in this example.

EXAMPLE 4

Ninety-two parts, by weight, of dry lead powder (through 325 mesh) with a purity of 99.5% lead was thoroughly mixed with eight parts, by weight, of technical grade boron carbide (B$_4$C) (through 20 mesh) containing 70% boron. Water was added to form a stiff mortar, which then was placed in a mold. The mold was vibrated to express excess water, and then allowed to cure with the loss of free water for a period of two weeks, at uncontrolled room temperature. The material set to form an easily self-supporting structure with good nuclear radiation properties for a mixed flux of neutron and gamma radiation.

The lead is effective in removing gamma rays in the initial primary flux as well as induced gamma from thermal capture of neutrons by the boron. Lead also attenuates neutrons with energy levels above about three million electron volts (3 mev.) to spallation energy levels by inelastic scatter. The carbon present is a good moderator for neutrons with energy levels above thermal neutrons.

EXAMPLE 5

A volumetric dry mixture consisting of:

60 parts lead powder (minus 200 mesh)
30 parts boron frits, 50% B$_2$O$_3$ (−20, +60 screen, Tyler scale)
10 parts sucrose was prepared, and water was added to form a stiff paste. The mixture was placed in a mold, vibrated and allowed to set and cure at room temperature to form a self-supporting structure containing lead, boron, carbon, hydrogen, and oxygen atoms with efficient attenuating characteristics. The solubility of sucrose in water assisted by capillary action the filling of voids smaller than the particle size of the ingredients.

EXAMPLE 6

A dry mixture was prepared consisting, by volume, of the following ingredients:

45 parts lead powder (325 mesh)
20 parts lead powder (100 mesh)
15 parts portland cement
10 parts boron nitride
5 parts lamp black.

A stiff paste with good workability was made with the addition of water, which then was placed in a mold. The excess water was expressed through drainage holes in the mold by rodding and vibration, and a small amount of the dry powder was placed on top and rodded thoroughly into the surface to remove small amounts of slurry rising to the top. Free water was lost by evaporation as well as by chemical action with the portland cement.

EXAMPLE 7

A dry mixture was made on a volumetric basis of the following composition:

4 parts lead powder
3 parts carbon (anthracite coal −20, + 60 mesh)
3 parts portland cement.

Sufficient water was added to form a stiff, easily workable paste, which was placed in a mold. Excess water was expressed by rodding and vibration techniques, and the cast mortar was allowed to cure for 28 days. As a shielding material, the lead degraded high energy neutrons by inelastic scatter and attenuated the resultant gamma. Carbon moderated neutrons to the thermal energy level, and hydrogen, fixed by the portland cement, in hydrate form, assisted in the attenuation of neutrons.

This composition may be modified by the introduction of a natural occurring iron ore aggregate such as limonite, which contains bound and adsorbed water, with a chemical composition of Fe$_2$O$_3$·$x$H$_2$O. This formulation provides additional hydrogen for neutron attenuation, at the expense of reducing the neutron moderator, carbon. The following composition, indicated on a volume basis, illustrates such a composition:

4 parts lead powder
1 part carbon
3 parts portland cement
2 parts limonite (¼" mesh).

EXAMPLE 8

Dry powders were mixed in the following proportions by weight:

80 parts lead powder (minus 200 mesh)
15 parts high density polyethylene powder (minus 20 mesh)
4 parts sucrose (granular)
1 part charcoal (minus 60 mesh).

Water was added to produce a thick plaster which then was applied to a concrete wall previously coated with a bonding agent. After setting and curing for 1 month, the plaster was coated with an epoxy resin to seal and harden the surface.

Substitution of all or part of the polyethylene powder by pulverized borated polyethylene produced a composition superior in thermal neutron capture for situations desirous of this characteristic. Similar modifications using various metal filled plastics with a wide variety of selected metals, or metallic compounds with many different types of plastics permit great latitude in formulating shields for special situations. These metal filled plastics may be prepared by use of standard equipment such as rolling mills or Banbury type mixers, followed by standard grinding or pulverizing operations, often at low temperatures.

EXAMPLE 9

The combination of hydrogen with a heavy metal as a hydride affords high gamma absorption as well as good neutron attenuation. Outstanding examples of these hydrides are tantalum hydride (TaH) with an elemental hydrogen density of $5.1 \times 10^{22}$ atoms cm.$^{-3}$, and an extra high normal X-ray density of 15.25 g. cm.$^{-3}$, and titanium hydride (TiH$_2$) with an even higher elemental hydrogen density of $9.5 \times 10^{22}$ atoms cm.$^{-3}$ and a normal X-ray density of 3.91$^{-3}$. On the other hand, gadolinium hydride combines the gadolinium atom with high thermal neutron capture, and the hydrogen atom for good neutron attenuation. All three of these hydrides may be dispersed respectively in the lead powder-water matrix in a one to four volume ratio to produce effective shielding for a mixed neutron-gamma radiation flux.

EXAMPLE 10

Powdered lead, titanium hydride, colemanite ore and water were mixed in the following volumetric proportions:

4 parts lead powder (minus 200 mesh)
3 parts titanium hydride (200 mesh), TiH$_2$
3 parts colemanite ore (20 mesh), containing Ca$_2$B$_6$O$_{11}$·5H$_2$O
3 parts water.

This mixture sets to produce a composition of very satisfactory mechanical properties and a density of about 5½ grams per cubic centimeter, or 350 pounds per cubic foot. The approximate distribution of the relevant elements for shilding consideration are as follows:

| Element: | Percent by weight |
|---|---|
| Hydrogen | 2.0 |
| Boron | 3.0 |
| Titanium | 18.0 |
| Lead | 52.5 |
| Calcium | 4.0 |
| Oxygen | 18.0 |
| Other elements | 2.5 |
| | 100.0 |

The elements present provide a complete shielding operation: Lead degrades neutrons with energies higher than a few mev. It also attenuates gamma radiation by pair effect, Compton scatterings and photo-electric effect. Beta radiation resulting from pair effect attenuation is then attenuated by low Z elements, producing lower energy gamma radiation by bremsstrahlung, which in turn is attenuated by lead through photo-electric effect. Hydrogen degrades effectively neutrons with energies below about 1 mev., and with decreasing effectiveness as the neutron energy increases above approximately 1 mev. Titanium is relatively more effective at higher energy levels because of its higher atomic number. Calcium, oxygen and boron all will degrade neutrons, particularly those with energy levels below about 1 mev. Neutrons degraded to thermal energy (0.025 mev.) are captured efficiently by boron, producing some gamma of about 0.5 mev., which in turn, is attenuated by lead.

The combined effects of the composition of the present invention is superior neutron attenuation and very good gamma attenuation. Much of the gamma is induced at the inner portion of the shield and is thus attenuated quickly, and the proportion of high energy neutrons penetrating deep into the shield will be small.

The shielding composition of this illustration may be used either alone or in multiple layer combinations with other materials, as, for example, a layer of the present composition interspersed between a layer of material having high moderating efficiency and a layer having high gamma attenuation efficiency.

This composition may be modified or fortified to meet the requirements of the particular radiation flux encountered. It further illustrates various means of introducing desired elements into the lead-water matrix. Boron is added in the form of a natural ore, and hydrogen is added in the form of a metallic hydride ($TiH_2$), water of crystallization ($Ca_2B_6O_{11} \cdot 5H_2O$), as well as retained water in the cured lead-water matrix.

EXAMPLE 11

High density shielding compositions are obtained by using heavy metal aggregates dispersed in the lead powder-water matrix. Compounds of these metals, alloys, natural or concentrated ores, and mine tailings from heavy metal operations may be substituted for the heavy metallic elements aggregations, usually with a sacrifice in density of the finished product. Illustrative of the higher density compositions are included in the following examples.

Forty parts by weight lead powder, passing a 200 mesh screen, were thoroughly mixed with sixty parts by weight metallic uranium depleted of its 235 isotope. This depleted uranium was in the form of small cylinders produced by cutting extruded one-sixteenth inch wire into one-sixteenth lengths. Water was added to the dry mixture to produce a moldable mass. After expressing excess water, and curing for 10 days at room temperature, the composition had a density of approximately 14 g. cm.$^{-3}$.

Uranium 238, the chief aggregate of this composition, is an alpha emitter and appropriate caution should be used in handling this material. It should not be used in connection with a flux containing neutrons because of the formation of radio active plutonium. However, the composition has significantly superior attenuation for X-ray and gamma radiation for two reasons. In the first place, the attenuation coefficient on a mass basis of uranium is higher than that for lead, ranging from about 5 percent improvement in the 5 mev. energy range to about 20 percent in the 0.5 mev. energy range. Secondly, uranium has a density about 65 percent higher than lead. These combined factors justify the higher cost where high attenuating efficiency is required.

Substitution of tungsten metal, passing a ¼ inch screen, for the depleted uranium metal in the previous example produced a composition of approximately the same density.

Lead shot also may be dispersed in the lead powder matrix as follows:

60 volumes of lead shot, 0.5 inch diameter
20 volumes of lead No. 12 shot, 0.05 inch diameter
15 volumes of lead powder, 200 mesh and fines
5 volumes of lithium carbonate powder.

The dry ingredients were placed in a standard concreate mixer and thoroughly blended before adding water, a little at a time, until a workable concrete was formed. The wet mass was poured into permanent steel forms, and rodded and vibrated to eliminate excess water. The concrete set to a self-supporting structure with a density of a little greater than 10 g. cm.$^{-3}$.

EXAMPLE 12

One volume of lead powder passing a 200 mesh screen and one volume of a galena ore of mixed sizes between 10 and 100 mesh were mixed with water to produce a stiff workable mass, which then was poured in wooden forms and vibrated to remove excess water. After curing for a period of two weeks, uncovered in the open, a good self-supporting structure was obtained.

Tailings from heavy metal mine operations may be substituted successfully for the galena ore in the preceding example.

EXAMPLE 13

Atoms of a number of elements in the lanthanum series (atomic numbers 57–72) are particularly efficient for thermal neutron attenuation, especially gadolinium, samarium and europium. Relative effectiveness may be noted from cross-section values included in Table 1. Dysprosium has a lower reaction cross-section but its relatively high scatter cross-section gives it special merit as a nuclear shielding component for special situations. Isotopic enrichment, as was noted previously for lithium 6 and boron 10, is applicable with these elements, especially for gadolinium and samarium. The use of these pure metalic materials in a pure state has particular advantage in manned space exploration where special high attenuating efficiencies, low secondary radiation effects and limited volume considerations more than compensate for the high cost of material. Additions also may be made in the form of a compound of these elements. Costs may be reduced by substitution of high grade rare earth ores, or ore concentration tailings resulting from extraction of other rare earths.

One volume of gadolinium oxide and two volumes of lead powder were mixed dry, and water was added to form a workable paste, which was placed in a form and vibrated to eliminate voids and remove excess water. A self-supporting structure was produced after the mass was allowed to remain in the open for one week. Satisfactory structures also were obtained in similar experiments using one volume of the oxide for each volume of lead powder, and also using 2 volumes of oxide for each volume of lead powder.

These compositions are particularly effective in nuclear shielding work because of the very high neutron attenuation of thermal neutrons, with a cross-section of 4,600 barns, for the gadolinium atom present in natural abundance. Isotopic enrichment with gadolinium 157, with a capture cross-section of approximately 240,000, produces an even superior attenuation composition.

Gadolinium metal may be substituted for gadolinium oxide in the preceding example, to give a higher concentration of gadolinium atoms in the composition. The metal may oxidize in moist air and react slowly with water, but after the lead composition sets, the continuous phase surrounding the gadolinium metal aggregate is a protection from such action.

For combined neutron moderation and capture, dysprosium carbonate and gadolinium carbonate may be combined as the aggregate. In such a material, dysprosium and carbon act as moderators with the gadolinium capturing the neutrons after reduction to thermal energy. The proportions of the mix may be varied to suit the particular flux involved. For example, against a high energy flux, the materials may be layered with dysprosium carbonate for the source face layer, then by a layer largely of dysprosium carbonate with some gadolinium carbonate, then by a layer of equal parts, then by a layer largely of the gadolinium carbonate with some dysprosium carbonate, and finally by a layer entirely of gadolinium carbonate. Such successive layers have very near maximum mass efficiency for attenuation of neutrons on a mass basis and very good efficiency on a linear basis. Gamma and X-ray radiation present in the flux is attenuated by the lead-water matrix, and lead also assists in the attenuation of neutrons at some of the higher energy levels.

Rare earth ore concentrates in the form of carbonates may be substituted for the foregoing aggregates in a volume ratio of one part ore concentrate to two parts of lead powder. A composition consisting of approximately 9% carbon, 6% gadolinium and 22% samarium is an example of such a substitution. This composition is a tailing resulting from extraction of other rare earths, and consequently is commercially available at relatively low costs.

A further illustration, demonstrating the flexibility of combinations useful in this invention, used an oxide tailing aggregate with an analysis as follows:

| Metal | Atomic number | Oxide | Percent by weight |
|---|---|---|---|
| Cerium | 58 | $CeO_2$ | 0.23 |
| Praseodymium | 59 | $Pr_6O_{11}$ | 1.4 |
| Neodymium | 60 | $Nd_2O_3$ | 6.7 |
| Samarium | 62 | $Sm_2O_3$ | 26.3 |
| Europium | 63 | $Eu_2O_3$ | 0.13 |
| Gadolinium | 64 | $Gd_2O_3$ | 7.8 |

When ore concentrates contain deleterious impurities, which result in secondary radiation effects, such impurities can be removed from the initial mixture before blending, or the less effective finished product may be used in a laminated shielding arrangement.

What is claimed is:

1. A method of producing a self-supporting lead composition of predetermined thickness which comprises mixing 1 part water with about 15 to 20 parts gray lead powder by weight to form a mortar, applying said mortar as a plaster to a surface, and allowing the mortar to set in situ, said powder including particles of a size not exceeding about 2% of said thickness.

2. A method of claim 1 in which said mortar is placed in a mold prior to drying and setting and in which said particles do not exceed 0.5 inches in size.

3. A method of producing a self-supporting lead composition of predetermined thickness comprising forming a mixture of gray lead powder and water to form a workable composition, casting said composition in a mold and subsequently setting said composition by removal of substantially all free water from the casting, said powder including particles of a size not exceeding about 2% of said thickness.

4. The method of claim 3, wherein said powder does not exceed a size of about 100 mesh, said method further comprising adding solid particles to said mixture, said solid particles being a material effective for neutron moderation, neutron capture or photon attenuation.

5. The method of claim 4, in which the weight of water in the lead and water mixture is initially between 4.5 and 7.5 percent of the weight of lead.

6. The method of claim 3, in which the lead powder has a radioactive intensity less than approximately 15 pico curie alpha gram$^{-1}$.

7. The method of claim 4, in which said material is selected from substances containing atoms with atomic numbers below 10.

8. The method of claim 4, in which said material includes a substance containing atoms selected from a class comprising carbon, boron, lithium and hydrogen.

9. The method of claim 4, in which said material includes hydrogen compounds in the form selected from the class comprising an organic compound, a hydride, a hydroxide and a hydrate.

10. The method of claim 4, in which said further material comprises a substance containing isotopes of an element in a ratio that deviates from that present in natural abundance.

11. The method of claim 10, in which said enriched isotope is selected from the class comprising lithium 6 and boron 10.

12. The method of claim 4, in which said further material includes atoms of a lanthanide selected from a class comprising samarium, europium, gadolinium and dysprosium.

13. The method of claim 4, in which said added particles include a substance containing a heavy metallic atom that in the free elemental state has a density greater than approximately 7.0 g. cm.$^{-3}$, at 20° C.

14. The method of claim 4, in which said added particles are in the form of aggregates of a size that are retained on a 3/32 inch mesh screen.

15. The method of claim 14, in which said aggregate is selected from a class comprising lead, tungsten and depleted uranium.

16. The method of claim 4, in which said added particles are in the form of aggregates with a multiplicity of screen sizes.

17. A lead composition poduced by the method according to claim 4.

18. A method comprising forming the lead composition of claim 4 into a nuclear radiation shield.

19. A method comprising forming the lead composition of claim 4 into a laminated nuclear radiation shield consisting of successive layers with different attenuating characteristics.

20. The method of claim 1, in which the weight of water in the lead and water mixture is initially between 4.5 and 7.5 percent of the weight of lead.

21. The method of claim 3, in which the weight of water in the lead and water mixture is initially between 4.5 and 7.5 percent of the weight of lead.

22. The method of claim 1 in which the lead powder has a radioactivity intensity less than about 15 pico curie alpha gram$^{-1}$.

23. A lead composition produced by the method according to claim 1.

24. A method comprising forming the lead composition of claim 1 as a nuclear radiation shield.

25. A method comprising forming the lead composition casting of claim 1 as a radiological beam plug, a radiological beam target, a collimator or a shadow shield.

26. The method of claim 1 in which the entire procedure is effected at room temperature and in the absence of significant pressure.

27. A method comprising forming the lead composition casting of claim 4 as a radiological beam plug, a radiological beam target, a collimator or a shadow shield.

28. The method of claim 4 in which the entire procedure is effected at room temperature and in the absence of significant pressure.

References Cited

UNITED STATES PATENTS

| | | | |
|---|---|---|---|
| 2,696,431 | 12/1954 | Kidd | 75—.5 A |
| 2,711,686 | 6/1955 | Denison et al. | 100—37 |
| 2,235,487 | 3/1941 | Mayer | 75—.5 B |
| 2,726,339 | 12/1955 | Borst | 252—478 X |
| 2,315,061 | 3/1943 | King | 106—105 X |
| 3,122,513 | 2/1964 | Dempsey | 250—108 WS X |
| 3,145,184 | 8/1964 | Schumann | 252—478 |
| 3,039,000 | 6/1962 | Kieffer et al. | 250—108 R |
| 3,664,824 | 5/1972 | Meadus et al. | 264—111 X |
| 3,340,024 | 9/1967 | Mahar | 29—192 R |
| 3,085,319 | 4/1963 | Giraitis et al. | 75—.5 A |
| 3,495,972 | 2/1970 | Baum | 75—.5 R |
| 3,694,536 | 9/1972 | Foerster | 264—111 |

ROLAND E. MARTIN, JR., Primary Examiner

U.S. Cl. X.R.

29—192, 192 CP, 195; 75—.5 R, .5 A, .5 B, 77; 106—85, 105, 297; 250—517; 252—63.5, 478, 8.1; 264—111